(12) United States Patent
Yang et al.

(10) Patent No.: US 9,173,230 B2
(45) Date of Patent: Oct. 27, 2015

(54) METHOD FOR SCHEDULING DATA BURST

(71) Applicant: National Taiwan University of Science and Technology, Taipei (TW)

(72) Inventors: Feng-Ming Yang, Taipei (TW); Wei-Mei Chen, Taipei (TW); Han-Peng Jiang, Changhua County (TW)

(73) Assignee: National Taiwan University of Science and Technology, Taipei (TW)

( * ) Notice: Subject to any disclaimer, the term of this patent is extended or adjusted under 35 U.S.C. 154(b) by 175 days.

(21) Appl. No.: 13/875,304

(22) Filed: May 2, 2013

(65) Prior Publication Data

US 2014/0153501 A1     Jun. 5, 2014

(30) Foreign Application Priority Data

Dec. 4, 2012  (TW) ............................. 101145513 A

(51) Int. Cl.
*H04W 72/12* (2009.01)
*H04L 12/26* (2006.01)
*G06F 1/00* (2006.01)

(52) U.S. Cl.
CPC ...... *H04W 72/1242* (2013.01); *H04W 72/1236* (2013.01); *G06F 1/00* (2013.01); *H04L 12/26* (2013.01)

(58) Field of Classification Search
None
See application file for complete search history.

(56) References Cited

U.S. PATENT DOCUMENTS

| | | | |
|---|---|---|---|
| 6,707,821 B1 * | 3/2004 | Shaffer et al. | 370/395.4 |
| 8,050,215 B2 | 11/2011 | Kim et al. | |
| 8,059,535 B2 | 11/2011 | Wang et al. | |
| 8,238,280 B2 | 8/2012 | Lee et al. | |
| 2009/0296617 A1 * | 12/2009 | Lin et al. | 370/311 |

FOREIGN PATENT DOCUMENTS

| | | |
|---|---|---|
| TW | 200948103 | 11/2009 |
| TW | I368411 | 7/2012 |

OTHER PUBLICATIONS

"Office Action of Taiwan Counterpart Application", issued on Sep. 25, 2014, p. 1-p. 5.
Yang, "The Study of Resource Allocation Policy to Guarantee QoS in Wireless Multimedia Networks," Master's thesis, Jun. 4, 2012, Department of Electronic Engineering, National Taiwan University of Science and Technology.

* cited by examiner

*Primary Examiner* — Kodzovi Acolatse
(74) *Attorney, Agent, or Firm* — Jianq Chyun IP Office

(57) ABSTRACT

A method for scheduling data burst is provided. The method is adapted for a mobile apparatus. The method includes the following steps. Firstly, a data burst is generated, and a maximum delay time is calculated according to a delay constraint of the data burst. Next, whether to receive a downlink data burst before the maximum delay time is determined. If yes, a base station is requested to schedule the data burst to at least one available scheduling time near the downlink data burst. Afterwards, the data burst is sent according to the at least one available scheduling time.

6 Claims, 7 Drawing Sheets

METHOD FOR SCHEDULING DATA BURST

CROSS-REFERENCE TO RELATED APPLICATION

This application claims the priority benefit of Taiwan application serial no. 101145513, filed on Dec. 4, 2012. The entirety of the above-mentioned patent application is hereby incorporated by reference herein and made a part of this specification.

TECHNICAL FIELD

The disclosure relates to a method for scheduling, and particularly relates to a method for scheduling data burst.

BACKGROUND

In the communication systems, since the mobile apparatuses that are of mobility use limited power of batteries as the primary power source, IEEE 802.16e/m provides different types of power-saving mode corresponding to different traffic properties in order to reduce power consumption of the mobile apparatuses. More specifically, a mobile apparatus may have to negotiate with the base station if the mobile apparatus intends to enter the sleep mode. In addition, the base station determines whether the mobile apparatus is allowed to enter the sleep mode, the type of power-saving mode in use, and the relevant parameters. The mobile apparatus entering the sleep mode may turn off the receiver/transmitter to save power. If further adjustments are made with consideration of the above and the quality of service that are acceptable to the customers, unnecessary power consumption may be further reduced.

In the 4G communication system, the operation of sleep mode is highly related to the time duration of sleep. Based on the above, various studies and patents regarding different power-saving mechanisms have been proposed. However, the studies and patents merely focus on the applicable conditions of unicast multi-connections without proposing an effective power-saving scheduling mechanism to allow the mobile apparatuses to keep the quality of service (QoS) while maintaining the power-saving function.

SUMMARY

In view of the foregoing, the disclosure provides a method for scheduling data burst, which may effectively reduce the awake time of the mobile apparatuses to reduce power consumption.

The disclosure provides a method for scheduling data burst adapted for a mobile apparatus that includes the following. First, during a listening frame period, at least one data burst from at least one data stream are detected, wherein each of the data bursts has a start time and a finish time. Then, at least one available schedule time is searched for, and whether a duration of each of the data bursts is overlapped with a time duration of another of the data bursts is determined. If the time duration of any one of the data bursts is not overlapped with the time duration of the other of the data bursts, one of the data bursts having an earliest finish time is received according to the at least one available schedule time. If the time duration of any one of the data bursts is overlapped with the time duration of the other of the data bursts, whether there is a first data burst that is about to fail to satisfy a delay constraint for each of the data bursts is determined. If there is the first data burst that is about to fail to satisfy the delay constraint, the first data burst is received according to the at least one available schedule time. If the first data burst that is not about to fail to satisfy the delay constraint, the one of the data bursts having the earliest finish time is received, and other data bursts having a time duration overlapped with a time duration of the one of the data bursts having the earliest finish time in the data bursts is delayed for a frame duration.

In an embodiment of the disclosure, searching for the at least one available schedule time includes at a frame finish time in the listening frame period, respectively determining whether the finish time of each of the data bursts is earlier than the frame finish time. If the finish time of each of the data bursts is earlier than the frame finish time, a period between the finish time of each of the data bursts and the frame finish time of the listening frame period is set to be the at least one available schedule time. If the finish time of each of the data bursts is not earlier than the frame finish time, a period between a finish time of receiving a data burst that is previously received and the start time of each of the data bursts is set to be the at least one available schedule time.

In an embodiment of the disclosure, given that there is the data bursts that is previously received, a period between the starting time point of the listening frame period and the start time of each of the data bursts is set to be the at least one available schedule time.

In an embodiment of the disclosure, receiving the one of the data bursts having the earliest finish time according to the at least one available schedule time includes determining whether the at least one available schedule time is suitable for receiving the one of the data bursts having the earliest finish time. If the at least one available schedule time is suitable for receiving the one of the data bursts having the earliest finish time, the one of the data bursts having the earliest finish time is received.

In an embodiment of the disclosure, determining whether there is the first data burst that is about to fail to satisfy the delay constraint in each of the data bursts includes respectively determining among the data bursts, whether there is the first data burst having a cumulative delay time about to exceed the delay constraint, wherein the cumulative delay time of each of the data bursts is respectively a time difference between a finish time and an initial start time of each of the data bursts.

In an embodiment of the disclosure, after delaying other data bursts in the data bursts overlapped with the one of the data bursts having the earliest finish time for the frame duration, recording an initial start time of the other data bursts is further included. Afterwards, a transmitting priority of the other data bursts is set according to a cumulative delay time of the other data bursts.

In an embodiment of the disclosure, setting the transmitting priority of the other data bursts according to the cumulative delay time of the other data bursts includes setting the transmitting priority of the other data bursts to be the highest when the cumulative delay time of the other data bursts is more than the delay constraint of the other data bursts. Then, when the cumulative delay time of the other data bursts is less than the delay constraint of the other data bursts, the transmitting priority of the other data bursts is set to be the lowest.

From another aspect, the disclosure provides a method for scheduling data burst adapted for a mobile apparatus that includes the following. First, a data burst is generated, and a maximum delay time is calculated according to a delay constraint of the data burst. Then, whether a downlink data burst is received before the maximum delay time is determined. If the downlink data burst is received before the maximum delay time, a base station is requested to schedule the data burst to at least one available schedule time near the downlink data burst, and the data burst is transmitted according to the at least one available schedule time.

In an embodiment of the disclosure, after determining that the downlink data burst is not received before the maximum delay time, determining whether at least one other data burst is generated is further included. If the at least one other data burst is generated before the maximum delay time, the base station is requested to schedule the data burst and the at least one other data burst to the same or adjacent at least one available schedule time. Then, the data burst and the at least one other data burst is transmitted according to the at least one available schedule time.

In an embodiment of the disclosure, after determining that the at least one other data burst is not generated before the maximum delay time, transmitting the data burst according to a scheduling result of the base station is further included.

In an embodiment of the disclosure, calculating the maximum delay time according to the delay constraint of the data burst includes calculating the maximum delay time by adding up a start time of the data burst and the delay constraint.

In an embodiment of the disclosure, the downlink data burst includes a multicast/broadcast service data burst transmitted by the base station.

In view of the foregoing, the method for scheduling data burst provided in the disclosure allows the mobile apparatus to effectively transmit and receive the data burst according to the available schedule time. Moreover, since the awake time of the mobile apparatus is reduced, the sleep period equivalently increases, thereby reducing power consumption of the mobile apparatus.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
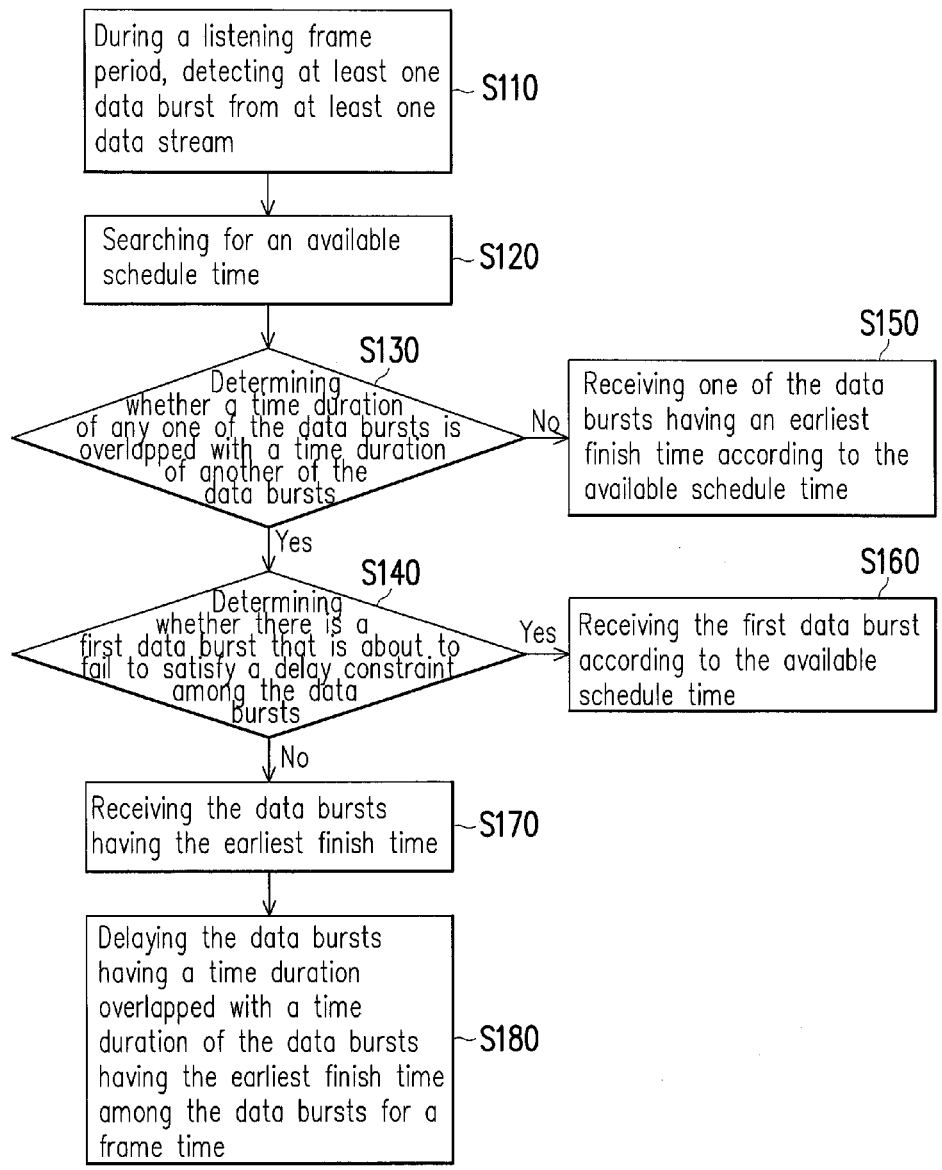
FIG. 1 is a flowchart illustrating a method for scheduling data burst according to an embodiment of the disclosure.

FIG. 1 is a flowchart illustrating a method for scheduling data burst according to an embodiment of the disclosure. In this embodiment, the method for scheduling data burst is adapted for mobile apparatuses such as smart phones, tablet, laptop, and personal digital assistants. FIGS. 2A to 2G are schematic diagrams illustrating scheduling of data bursts according to an embodiment of the disclosure. Detailed steps illustrated in FIG. 1 are explained below with reference to each frame in FIGS. 2A to 2G.

Figure 2A:
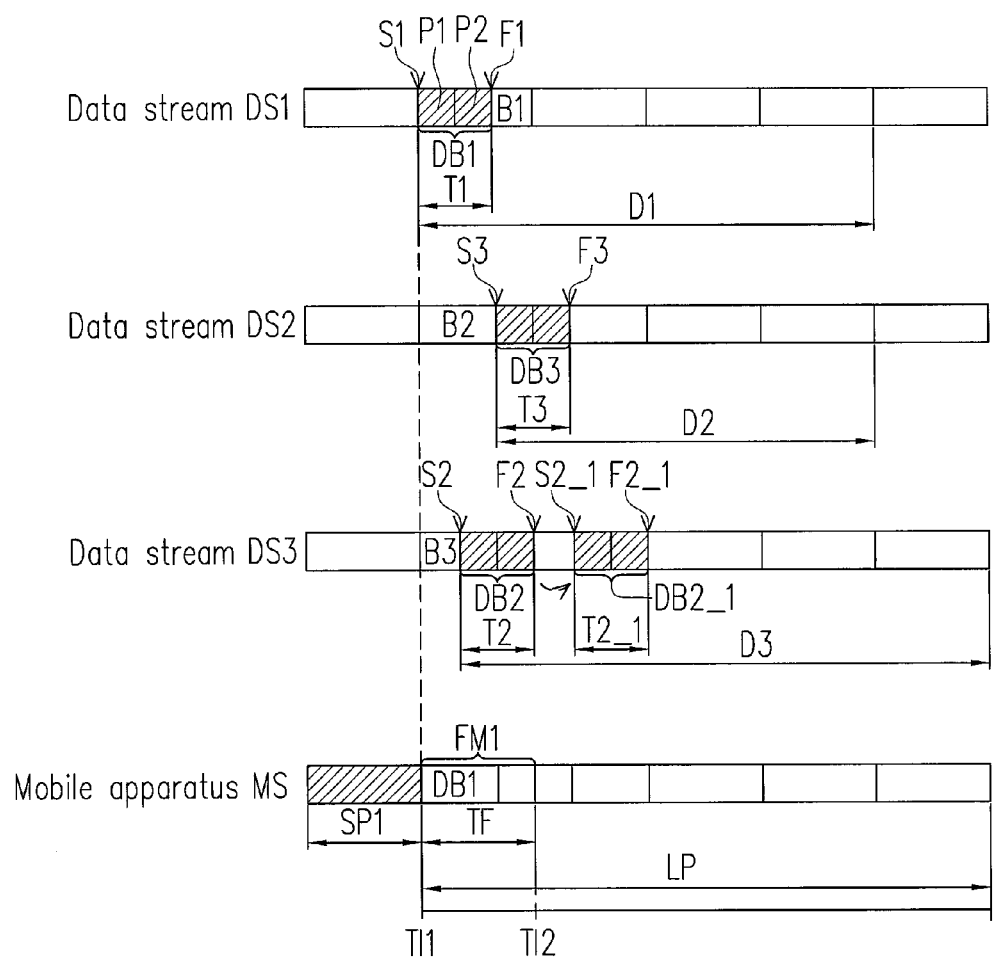
FIGS. 2A to 2G are schematic diagrams illustrating scheduling of a data burst according to an embodiment of the disclosure.

Referring to both FIGS. 1 and 2A, firstly, in a sleep period SP1, a mobile apparatus MS may reduce power consumption by turning off a receiver/transmitter of the mobile apparatus MS, for example. After entering a listening period LP, in step S110, the mobile apparatus MS may detect the data bursts from data streams DS1 to DS3 during a listening frame period FM1, wherein the data streams DS1 to DS3 may be, for example, a streaming signal transmitted from a base station. Taking FIG. 2A for example, data bursts detected by the mobile apparatus MS during the listening frame period FM1 includes data bursts DB1 to DB3. The data bursts DB1 to DB3 respectively have a start time and a finish time. Taking the data burst DB1 as an example, the data burst DB1 has a start time S1 and a finish time F1; as for the data burst DB2, it has a start time S2 and a finish time F2. Start times and finish times of all data bursts below are indicated in a similar way. In addition, the data bursts DB1 to DB3 are set to include two packets represented by two consecutive squares in FIG. 2A. Taking the data burst DB1 as an example, the data burst DB1 includes packets P1 and P2, and packets included by other data bursts are indicated in a similar way. People having ordinary skills in the art should understand that the number of packets included in each of the data bursts is set herein for an example, instead of serving as an limitation on applicable embodiments of the disclosure.

Then, in step S120, the mobile apparatus MS may search for an available schedule time during the listening frame period FM1. In this embodiment, the mobile apparatus MS may find out the available schedule time according to the start times of the data bursts DB1 to DB3 at a frame finish time TI2 of the listening frame period FM1 (i.e., a time point corresponding to the finish time F2). Specifically, at the frame finish time TI2, the mobile apparatus MS may respectively determine whether the finish times of the data bursts DB1 to DB3 are earlier than the frame finish time TI2. If the finish times of the data bursts DB1 to DB3 are earlier than the frame finish time TI2, the mobile apparatus MS may set a period from the finish times of the data bursts DB1 to DB3 to the frame finish time TI2 of the listening frame period FM1 as the available schedule time. Taking the data burst DB1 as an example, the mobile apparatus MS may determine that the frame finish time TI2 is later than the finish time F1, and then sets a period from the finish time F1 to the frame finish time TI2 to be an available schedule time B1.

On the other hand, when a finish time of a data burst is later than or equal to the frame finish time TI2, the mobile apparatus MS may set a period from a finish time of receiving a previously received data burst to a start time of the data burst to be the available schedule time. Taking the data burst DB3 as an example, since a finish time F3 of the data burst DB3 is later than the frame finish time TI2, the mobile apparatus MS may set a period from a finish time of receiving a previously received data burst to a start time S3 of the data burst DB3 to be the available schedule time. However, since the mobile apparatus MS does not receive any data burst in the listening period LP at this time, the mobile apparatus MS may set a period from a start time TI1 of the listening frame period FM1 to the start time S3 to be an available schedule time B2. Taking the data burst DB2 as another example, since the finish time F2 of the data burst DB2 is equal to the frame finish time TI2, the mobile apparatus MS may set a period from the start time TI1 of the listening frame period FM1 to the start time S2 to be an available schedule time B3.

Subsequently, in step S130, the mobile apparatus MS may determine whether time durations of the data bursts DB1 to DB3 are overlapped with each other. The time duration is, for example, a transmission time required for transmitting a data burst in the standard of a communication system. As illustrated in FIG. 2A, since a time duration T1 of the data burst DB1 is overlapped with a time duration T2 of the data burst DB2, in step S140, the mobile apparatus MS may further determine whether there exists any data burst in the data bursts DB1 to DB3 that is about to fail to satisfy a delay constraint.

More specifically, since each of the data bursts may not be instantly received as being detected, a cumulative delay time of each of the data bursts needs to satisfy the delay constraint, so as to meet a quality of service of each of the data streams for providing information. People having ordinary skill in the art should understand that in the standard of a communication system, data bursts may have different delay constraints according to the data types. For example, when the data type of a data burst is the data having a higher transmitting priority (e.g., audio or video data), the data burst would correspondingly have a shorter delay constraint in the communication standard. When a data type of a data burst is a data having a lower transmitting priority (e.g., an e-mail), the data burst would correspondingly has a longer delay constraint in the communication standard.

Therefore, the mobile apparatus MS may individually determine whether there is a first data burst that is about to exceed the delay constraint in the data bursts DB1 to DB3. In this embodiment, since a range of delay for the data bursts is a frame duration, when an addition of a cumulative delay time of a data burst and a frame duration exceeds the delay constraint, the data burst is considered to be the first data burst that is about to exceed the delay constraint.

In this embodiment, it is assumed that the delay constraints of the data bursts from the data streams DS1 to DS3 are respectively delay constraints D1 to D3. Therefore, since for the mobile apparatus MS, the data bursts DB1 to DB3 are all detected for the first time, and the data bursts DB1 to DB3 do not exceed the corresponding delay constraints, the mobile apparatus MS may proceed to step S170.

In step S170, the mobile apparatus MS may receive a data burst (with an earliest finish time i.e. the data burst DB1) by using the available schedule time. More specifically, the mobile apparatus MS may firstly determine whether there is an available schedule time suitable for receiving the data burst DB1 in the available schedule times B1 to B3. When the mobile apparatus MS determines that the available schedule time B2 is suitable for receiving the data burst DB1, the mobile apparatus MS may receive the data burst DB1 based on the available schedule time B2.

Then, in step 180, the mobile apparatus MS may delay other data bursts overlapped with the time duration of one of the data bursts DB1 to DB3 that has an earliest finish time for a frame duration. More specifically, since the time duration T2 of the data burst DB2 is overlapped with the time duration T1 of the data burst DB1, if the data burst DB2 is received at the same time when the data burst DB1 is received, the reception of the data burst DB1 may be affected. At this time, the mobile apparatus MS may delay the data burst DB2 for a frame duration TF to avoid affecting the data burst DB1. In other words, at this time, the data burst DB2 is delayed to a position of a data burst DB2_1, and the data burst DB2_1 may be considered as having a start time S2_1 and a finish time F2_1.

In one embodiment of the disclosure, to make each of the data bursts be able to meet the delay constraint, the mobile apparatus MS may record an initial start time of a data burst after the data burst is delayed. Taking the data burst DB2 for example, after the mobile apparatus MS delays the data burst DB2 to become the data burst DB2_1, the mobile apparatus MS may record the start time S2 of the data burst DB2. As a result, the mobile apparatus MS may determine whether the data burst DB2 meets the delay constraint of the data burst DB2 by calculating a time difference between the finish time F2_1 and the start time S2. In addition, the mobile apparatus MS may further set a transmitting priority of the data burst DB2_1 to be the lowest.

Figure 2B:
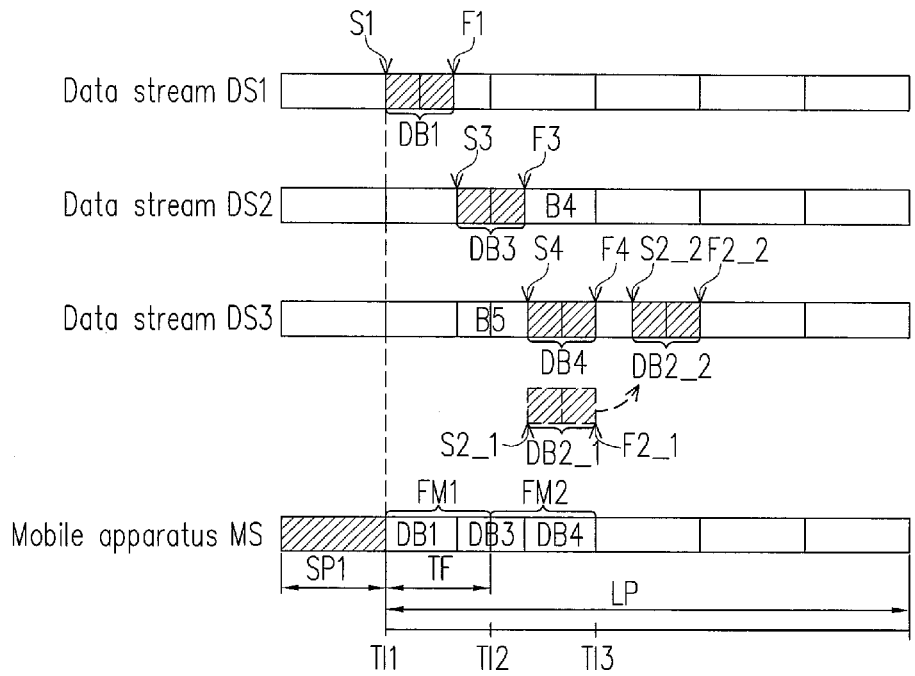

Referring to FIG. 2B, at a frame finish time TI3 of a listening frame period FM2, the mobile apparatus MS may detect a data burst DB4 related to the data stream DS3. Then, the mobile apparatus MS may find out an available schedule time based on the teachings above and each of the steps in FIG. 1. For example, the mobile apparatus MS may set a period between the finish time F3 and the frame finish time TI3 to be an available schedule time B4 after determining that the finish time F3 of the data burst DB3 is earlier than the frame finish time TI3. In addition, the mobile apparatus MS may determine that a finish time F4 of the data burst DB4 is equal to the frame finish time TI3, then set a period between a finish time (i.e. the finish time F1) of receiving a previously received data burst (i.e. the data burst DB1) and a start time S4 of the data burst DB4 to be an available schedule time B5.

Then, since a time duration of the data burst DB3 is not overlapped with other data bursts (e.g. the data burst DB1) (corresponding to the circumstance of "not overlapping" in S130), the mobile apparatus MS may use the available schedule time B5 to receive the data burst DB3 in step S150 after receiving the data burst DB1. However, since a time duration T2_1 of the data burst DB2_1 is overlapped with the data burst DB4, and the transmitting priority of the data burst DB2_1 is set to be the lowest, even if the data bursts DB4 and DB2_1 have the same finish time, the mobile apparatus MS would still firstly receive the data burst DB4 according to the available schedule time B5. Then, the mobile apparatus MS may delay the data burst DB2_1 for the frame duration TF to a position of a data burst DB2_2. At this time, the mobile apparatus MS may determine whether the data burst DB2_2 is about to fail to satisfy the delay constraint. For example, the mobile apparatus MS may determine whether a time difference between a finish time F2_2 of the data burst DB2_2 and an initial start time (i.e. the start time S2) of the data burst DB2_2 is larger than the delay constraint D3. Since the time difference herein is still less than the delay constraint D3, the mobile apparatus MS still sets a transmitting priority right of the data burst DB2_2 to be the lowest.

Figure 2C:
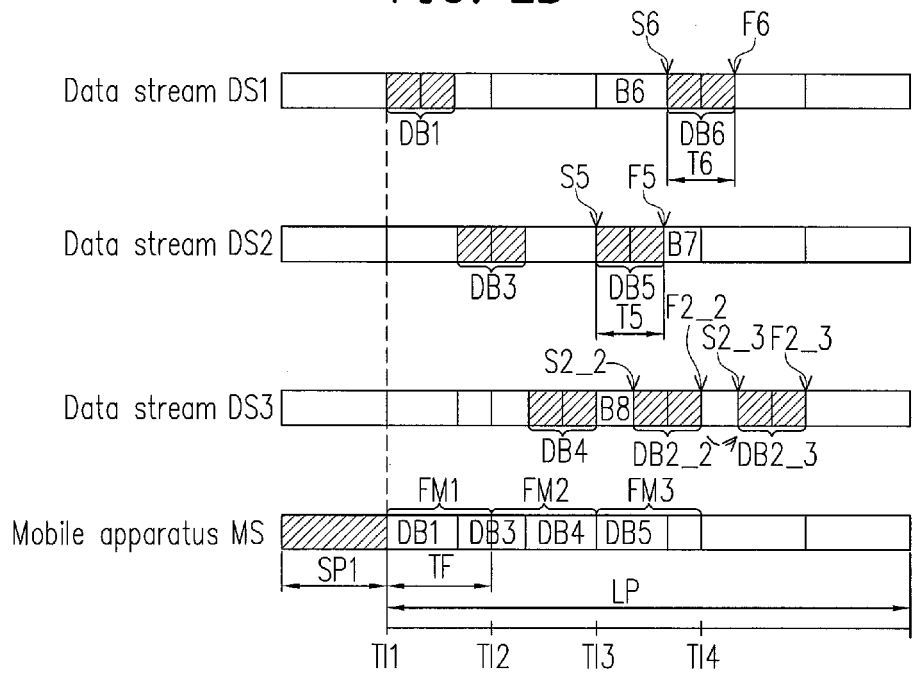

Referring to FIG. 2C, at a frame finish time TI4 of a listening frame period FM3, the mobile apparatus MS may detect data bursts DB5 and DB6. Then, the mobile apparatus MS may respectively find available schedule times B6 to B8 according to the teachings above. Moreover, when it is determined that a time duration T5 of the data burst DB5 is overlapped with a time duration T2_2 of the data burst DB2_2, the mobile apparatus MS may receive the data burst DB5 that has an earlier finish time according to the available schedule time B6. Then, the mobile apparatus MS delays the data burst DB2_2 to a position of a data burst DB2_3 and calculates a time difference between a finish time F2_3 of the data burst DB2_3 and an initial start time (i.e., the start time S2) of the data burst DB2_3 to determine whether the delay constraint of the data burst DB2_3 is about to fail to be satisfied. However, since the time difference herein is still less than the delay constraint D3, the mobile apparatus MS still sets a transmitting priority right of the data burst DB2_3 to be the lowest.

Figure 2D:
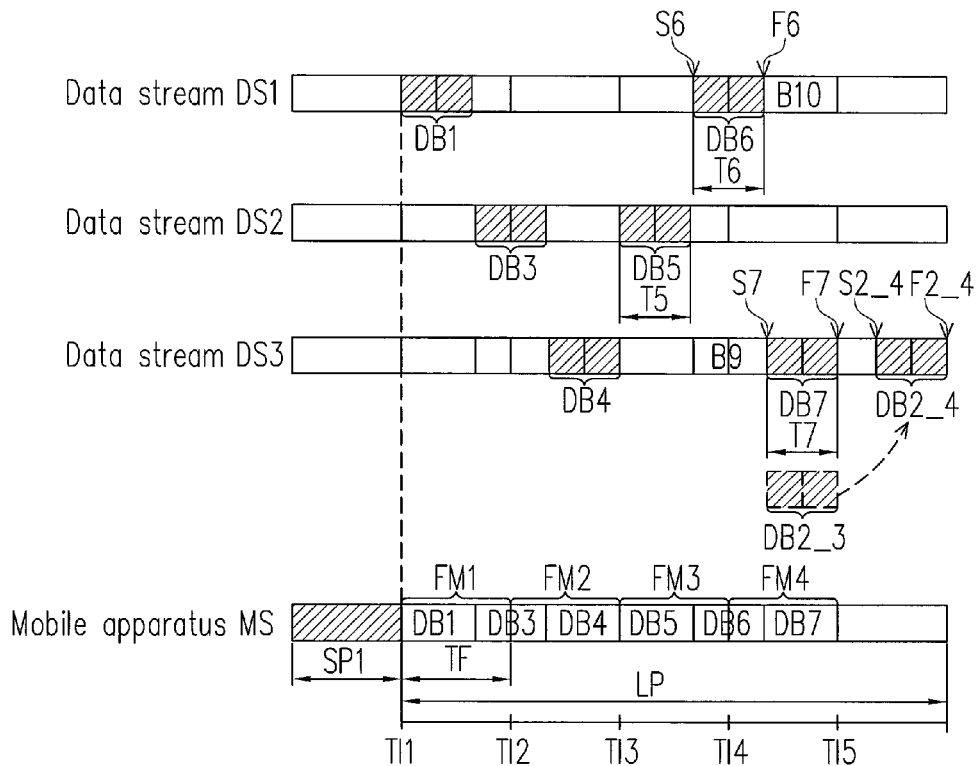

Referring to FIG. 2D, at a frame finish time TI5 of a listening frame period FM4, the mobile apparatus MS may detect a data burst DB7. Then, the mobile apparatus MS may respectively find available schedule times B9 to B10 according to the teachings above. Since a duration time T6 of the data burst DB6 is not overlapped with other data bursts, the mobile apparatus MS may receive the data burst DB6 according to the available schedule time B9. In addition, since the transmitting priority of the data burst DB2_3 is lower, the mobile apparatus MS may firstly receive the data burst DB7 according to the available schedule time B10.

Then, the mobile apparatus MS may delay the data burst DB2_3 to a position of a data burst DB2_4 and then calculates a time difference between a finish time F2_4 of the data burst DB2_4 and an initial start time (i.e. the start time S2) of the data burst DB2_4 to determine whether the delay constraint of the data burst DB2_3 is about to fail to be satisfied. Given that the delay constraint D3 is exceeded if the data burst DB2_4 is delayed for a frame duration again, the mobile apparatus MS may set a transmitting priority of the data burst DB2_4 to be the highest.

Figure 2E:
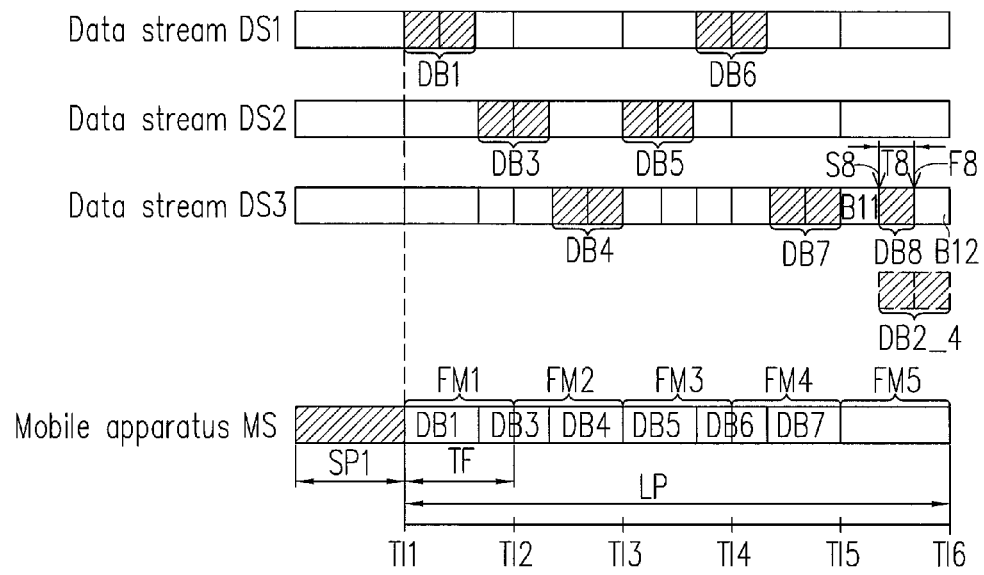

Referring to FIG. 2E, at a frame finish time TI6 of a listening frame period FM5, the mobile apparatus MS may detect a data burst DB8 and find available schedule times B11 to B12. In the situation that durations of the data bursts DB2_4 and DB8 are overlapped, even if a finish time S8 of the data burst DB8 is earlier than a finish time F2_4 of the data burst DB2_4, the mobile apparatus MS may firstly ignore the data burst DB8 because the data burst DB2_4 is about to exceed the delay constraint of the data burst DB2_4.

Figure 2F:
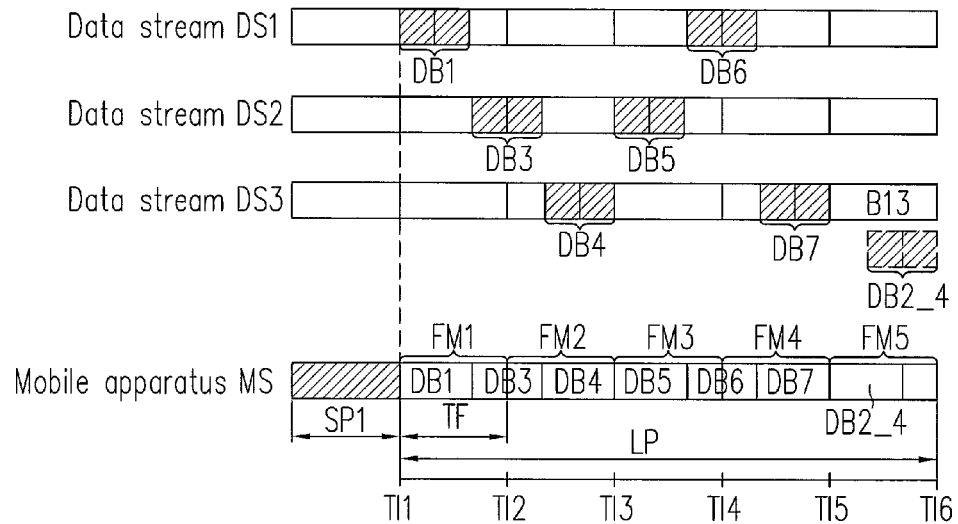

As shown in FIG. 2F, after ignoring the data burst DB8, the mobile apparatus MS may again find an available schedule time B13 according to the teachings above. Then, the mobile apparatus MS may receive the data burst DB2_4 according to the available schedule time B13 (corresponding to step S160). Afterwards, the mobile apparatus MS may find that there is still a period sufficient to receive the data burst DB8 in the listening frame period FM5, so the data burst DB8 may be delayed to a position corresponding to the period. Then, the mobile apparatus MS may receive the data burst DB8.

Figure 2G:
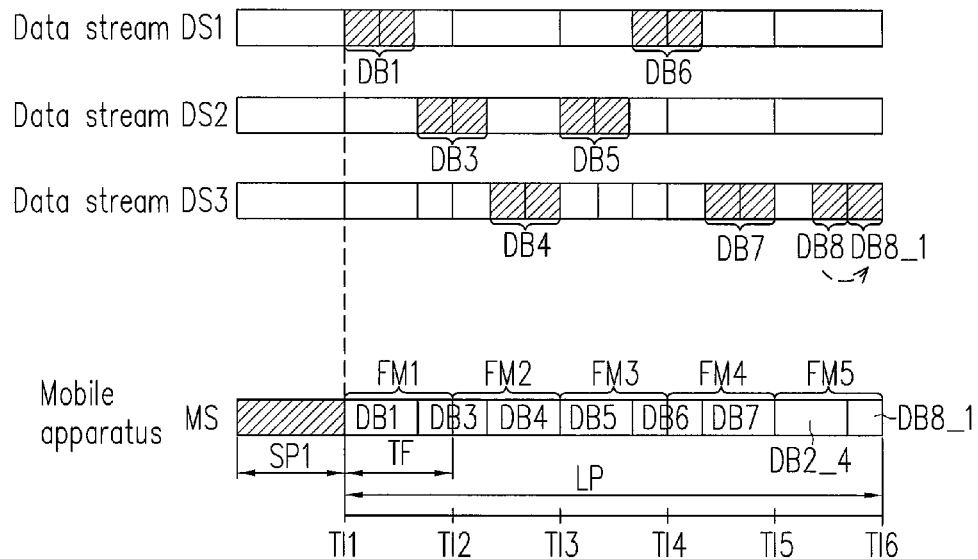

If the mobile apparatus MS does not detect any new data burst in the whole listening frame period after the listening frame period FM5, the mobile apparatus MS may enter a sleep period SP2, such that the power consumption of the mobile apparatus MS may be reduced. As shown in FIG. 2G, with the method for scheduling data burst of the disclosure, the mobile apparatus MS may thoroughly use the listening period LP to receive the data bursts DB1, DB3-DB7, DB2_4 and DB8_1. In other words, the mobile apparatus MS may receive data bursts in a more efficient way.

Figure 3:
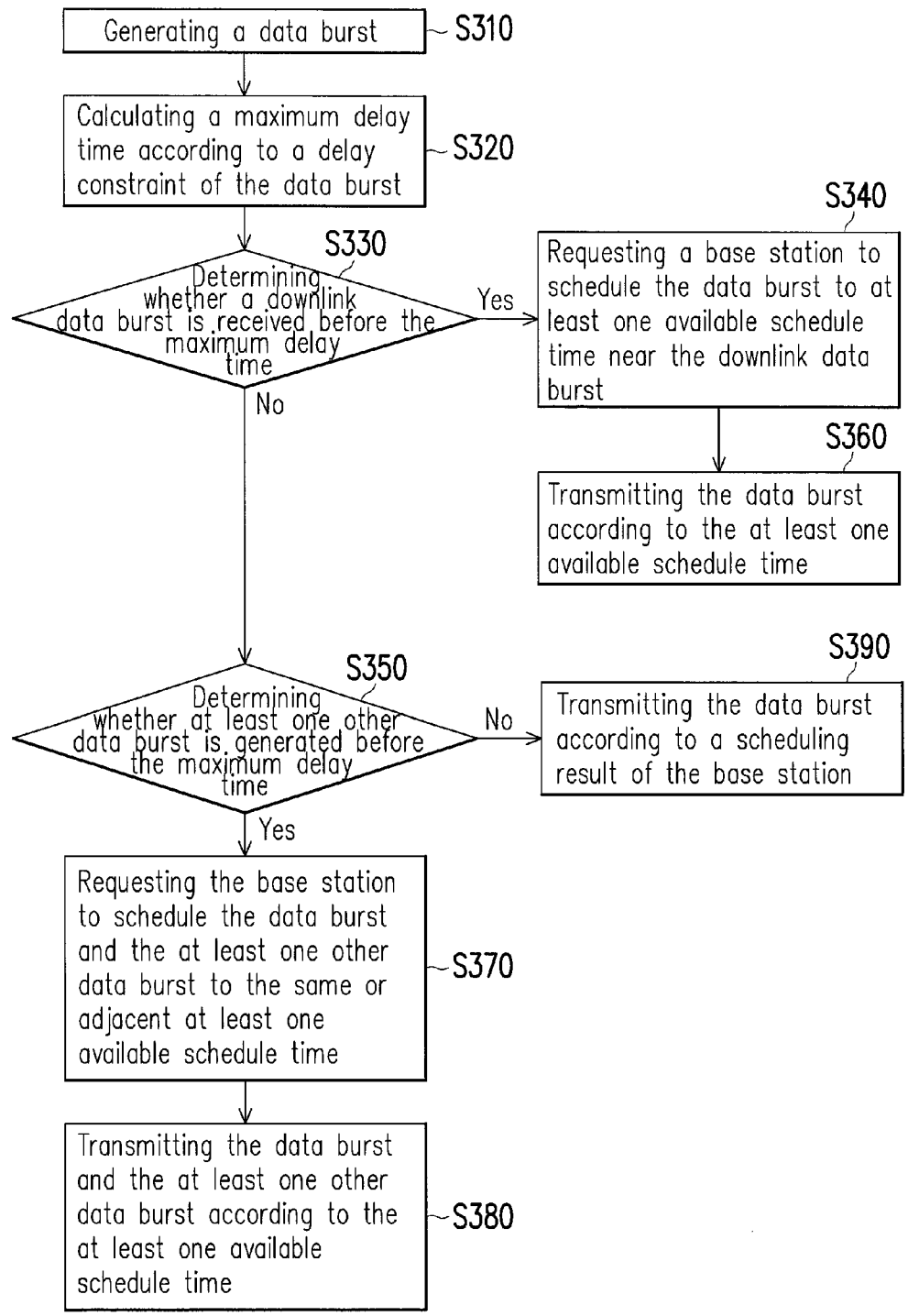
FIG. 3 is a flowchart illustrating a method for scheduling data burst according to an embodiment of the disclosure.
Figure 4:
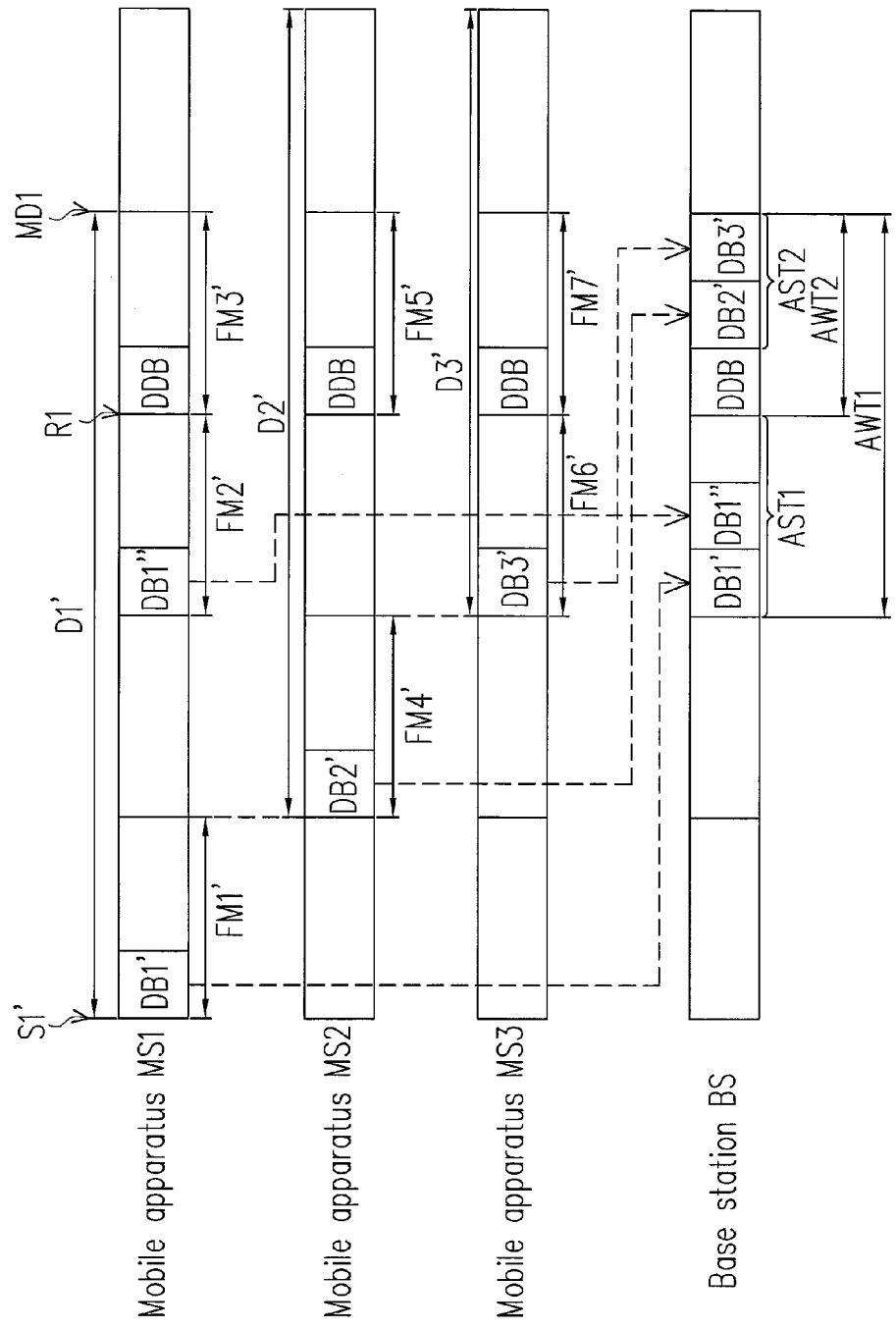
FIG. 4 is a schematic diagram illustrating scheduling of a data burst according to an embodiment of the disclosure.

FIG. 3 is a flowchart illustrating a method for scheduling data burst according to an embodiment of the disclosure. FIG. 4 is a schematic diagram illustrating scheduling of a data burst according to an embodiment of the disclosure. Detailed steps illustrated in FIG. 3 are explained below with reference to the time sequences illustrated in FIG. 4.

Referring to both FIGS. 3 and 4, taking a mobile apparatus MS1 as an example, the mobile apparatus MS1 may generate a data burst DB1' in step S310. The data burst DB1' may be, for example, the data that the mobile apparatus MS1 intends to transmit to a base station BS. Then, in step S320, the mobile apparatus MS1 may calculate a maximum delay time of the data burst DB1' according to a delay constraint of the data burst DB1'. In this embodiment, it is assumed that the delay constraint of the data burst DB1' is a delay constraint DP, and the mobile apparatus MS1 may add up a start time S1' of the data burst DB1' and the delay constraint D1' to calculate a maximum delay time MD1. Namely, to make the data burst DB1' being able to meet the QoS of the data burst DB1', the mobile apparatus MS1 needs to transmit the data burst DB1' before the maximum delay time MD1.

Then, in step S330, the mobile apparatus MS1 may determine whether to receive a downlink data burst before the maximum delay time MD1. In this embodiment, it is assumed that the mobile apparatus MS1 would receive a downlink data burst DDB at a time point R1. The downlink data burst DDB may be, for example, a multicast/broadcast service data burst transmitted by the base station. Therefore, in step S340, the mobile apparatus MS1 may subsequently request the base station BS to schedule the data burst DB1' near an available schedule time of the downlink data burst DDB. In addition, the mobile apparatus MS1 may perform a similar operation after generation of the data burst DB1'. Moreover, mobile apparatuses MS2 and MS3 may perform an operation the same as the above to request the base station BS to schedule data bursts DB2' and DB3' near an available schedule time of the downlink data burst DDB.

Since the base station BS needs to schedule the transmission time of the data bursts of the mobile apparatuses MS1 to MS3 that are connected to the base station BS, the base station BS may search for an available schedule time around the downlink data burst DDB after receiving the requests from the mobile apparatuses MS1 to MS3. In this embodiment, the available schedule times around the downlink data burst DDB are assumed to be available schedule times AST1 and AST2. Then, the base station BS may determine whether the available schedule times AST1 and AST2 are sufficient to receive data bursts that the mobile apparatuses MS1 to MS3 intend to transmit.

At this time, to make the time during which each of the mobile apparatuses is in an awake state as short as possible, the base station BS may schedule to receive data bursts of the same mobile apparatus to adjacent times. For example, the base station BS may schedule the data burst DB1' and a data burst DB1" that are both from the mobile apparatus MS1 to the available schedule time AST1. Then, in step S360, the mobile apparatus MS1 may transmit the data bursts DB1' and DB1" according to the available schedule time AST1.

As a result, it only takes an awake time AWT1 (including two frame periods, for example) for the mobile apparatus MS1 to finish transmitting the data bursts DB1' to DB1" and receiving the downlink data burst DDB. According to an original time schedule of the mobile apparatus MS1, an awake time for transmitting the data bursts DB1' to DB1" and receiving the downlink data burst DDB may be three frame periods (including frame periods FM1' to FM3', for example). Therefore, given that the awake time is reduced, a time that the mobile apparatus MS1 is in a sleep state correspondingly increases, such that the power consumption of the mobile apparatus MS1 may be effectively reduced.

In addition, the base station BS may schedule the data bursts DB2' and DB3' to the available schedule time AST2 after determining that the available schedule time AST2 is sufficient to receive the data bursts DB2' and DB3'. Then, the mobile apparatuses MS2 and MS3 may respectively transmit the data bursts DB2' and DB3' according to the available schedule time AST2.

Accordingly, the awake times of the mobile apparatuses MS2 and MS3 are also effectively reduced, thereby reducing the power consumption. For example, according to an original time schedule of the mobile apparatus MS2, an awake time of the mobile apparatus MS2 for transmitting the data burst DB2' and receiving the downlink data burst DDB may be two frame periods (including frame periods FM4' to FM5', for example). After the scheduling of the base station BS, the mobile apparatus MS2 only takes an awake time AWT2 (including one frame period, for example) to complete an operation of transmitting the data burst DB2' and receiving the downlink data burst DDB. For another example, according to an original time schedule of the mobile apparatus MS3, an awake time of the mobile apparatus MS3 for transmitting the data burst DB3' and receiving the downlink data burst DDB may be two frame periods (including frame periods FM6' to FM7', for example). After scheduling of the base station BS, the mobile apparatus MS3 only takes the awake time AWT2 (including one frame period, for example) to complete an operation of transmitting the data burst DB3' and receiving the downlink data burst DDB.

In other embodiments, when a mobile apparatus determines that no downlink data burst would be received before determining a maximum delay time of a data burst (corresponding to the circumstance of "not receiving" in step S330), the mobile apparatus may determine whether there is any other data burst generated before the maximum delay time of the data burst in step S350. If there is another generated data burst, the mobile apparatus may proceed to step S370 to request the base station to schedule the data burst and the other data burst to the same or adjacent available schedule times. Moreover, in step S380, the mobile apparatus may transmit the data burst and the other data burst according to the available schedule time. Consequently, the mobile apparatus may collectively transmit the data bursts intended to be transmitted at the same or adjacent available schedule times, such that an awake time of the mobile apparatus may be used more efficiently to transmit the data bursts that the mobile apparatus intend to transmit.

Moreover, given that a mobile apparatus determines that no data burst would be generated before the maximum delay time of the data burst (corresponding to the circumstance of "not generated" in step S350), the mobile apparatus may transmit the data burst according to the scheduling result of the base station. In other words, since the mobile apparatus cannot collectively transmit the data burst and the other data burst intended to be transmitted at the same or adjacent available schedule times, the data bursts may be transmitted according to scheduling of the base station.

In view of foregoing, the method for scheduling data burst provided in the embodiments of the disclosure makes the mobile apparatus to effectively use the listening period of the mobile apparatus to receive data bursts from each of the data streams. Therefore, the mobile apparatus in the disclosure may effectively reduce the listening period of the mobile apparatus and instantly enter the sleep period after the listening period to reduce the power consumption. Given that the listening period is reduced, the sleep period is correspondingly increased, making the power consumption of the mobile apparatus be further reduced.

In addition, when the mobile apparatus intends to transmit the data bursts, the mobile apparatus may request the base station to appropriately schedule the data bursts, such that the mobile apparatus may collectively transmit the data bursts at the same or adjacent available schedule times. Hence, the awake time of the mobile apparatus is also effectively reduced, thereby reducing the power consumption.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for scheduling data burst, adapted for a mobile apparatus, comprising:
    detecting at least one data burst from at least one data stream during a listening frame period, wherein each of the data bursts has a start time and a finish time;
    searching for at least one available schedule time;
    determining whether a time duration of any one of the data bursts is overlapped with a time duration of another data burst of the data bursts;
    if the time duration of any one of the data bursts is not overlapped with the time duration of another of the data bursts, receiving one of the data bursts having an earliest finish time according to the at least one available schedule time;
    if the time duration of any one of the data bursts is overlapped with the time duration of another of the data bursts, determining whether there is a first data burst that is about to fail to satisfy a delay constraint for each of the data bursts, wherein the first data burst about to fail to satisfy the delay constraint is a data burst whose cumulative delay time exceeds the delay constraint after being added by the frame duration;
        if yes, receiving the first data burst according to the at least one available schedule time;
        if no, receiving the one of the data bursts having the earliest finish time; and
    delaying the data bursts having a time duration overlapped with a time duration of the data bursts having the earliest finish time among the data bursts for a frame duration,
    wherein the step of searching for the at least one available schedule time comprises:
        determining whether the finish time of each of the data bursts is earlier than the frame finish time respectively at a frame finish time in the listening frame period;
        if the finish time of each of the data bursts is earlier than the frame finish time, setting a period between the finish time of each of the data bursts and the frame finish time of the listening frame period to be the at least one available schedule time; and
        if the finish time of each of the data bursts is not earlier than the frame finish time, setting a period between a finish time of receiving one of the data bursts that is previously received and the start time of each of the data bursts to be the at least one available schedule time.

2. The method as claimed in claim 1, wherein given that there is no the data bursts that is previously received, setting a period between the starting time point of the listening frame period and the start time of each of the data bursts to be the at least one available schedule time.

3. The method as claimed in claim 1, wherein the step of receiving the one of the data bursts having the earliest finish time according to the at least one available schedule time comprises:
    determining whether the at least one available schedule time is suitable for receiving the one of the data bursts having the earliest finish time;
    if the at least one available schedule time is suitable for receiving the one of the data bursts having the earliest finish time, receiving the one of the data bursts having the earliest finish time.

4. The method as claimed in claim 1, wherein the step of determining whether there is the first data burst that is about to fail to satisfy the delay constraint in each of the data bursts comprises:
    determining among the data bursts respectively, whether there is the first data burst having a cumulative delay time about to exceed the delay constraint,
    wherein the cumulative delay time of each of the data bursts is respectively a time difference between a finish time and an initial start time of each of the data bursts.

5. The method as claimed in claim 1, after the step of delaying the data bursts having the time duration overlapped with the time duration of the data bursts having the earliest finish time among the data bursts for the frame duration, further comprising:
   recording an initial start time of the other the data bursts; and
   setting a transmitting priority of the other data bursts according to a cumulative delay time of the other data bursts.

6. The method as claimed in claim 5, wherein the step of setting the transmitting priority of the other data bursts according to the cumulative delay time of the other data bursts comprises:
   setting the transmitting priority of the other data bursts to be the highest when the cumulative delay time of the other data bursts is more than the delay constraint of the other data bursts; and
   setting the transmitting priority of the other data bursts to be the lowest when the cumulative delay time of the other data bursts is less than the delay constraint of the other data bursts.

\* \* \* \* \*